United States Patent [19]

Chen

[11] Patent Number: 5,047,889
[45] Date of Patent: Sep. 10, 1991

[54] ELECTROMAGNETIC SWITCH WITH UNDERVOLTAGE AND PHASE FAILURE PROTECTION

[76] Inventor: Shu-Chin Chen, No. 30, Aly. 3, Ln. 469, Shan-Ting Sec., Chung-Feng Road, Tao-Yuan Hsien, Taiwan

[21] Appl. No.: 638,840
[22] Filed: Jan. 8, 1991
[51] Int. Cl.[5] .............................................. H02H 3/24
[52] U.S. Cl. ........................................ 361/92; 361/85
[58] Field of Search ..................... 361/85, 92, 86, 93, 361/102

[56] References Cited

U.S. PATENT DOCUMENTS 4,390,871 6/1983 Andrews ................................ 361/92
4,703,387 10/1987 Miller .................................... 361/92

Primary Examiner—Todd E. Deboer
Attorney, Agent, or Firm—Thomas R. Morrison

[57] ABSTRACT

A protective device prevents electrical load, such as three-phase induction motor, from overheat fault caused by undervoltage and phase failure condition in a three-phase power supply system. The circuit arrangement of the protective device includes a rectifier circuit, a voltage dropping circuit, a filter circuit, a current limiting circuit, a photo coupling circuit, and a large current control switch for controlling actuating coil of an electromagnetic switch. When the fault condition of undervoltage and phase failure is happen, the protective device will cut the load off the three-phase power source so that both the load and electromagnetic can be protected.

1 Claim, 4 Drawing Sheets

ELECTROMAGNETIC SWITCH WITH UNDERVOLTAGE AND PHASE FAILURE PROTECTION

BACKGROUND OF INVENTION

The present invention relates to a protective device for protecting an electrical load from overheat fault in a three-phase power supply system, and more particularly to a protective circuit for preventing three-phase induction motor from overheat fault caused by undervoltage and phase failure.

Three-phase power supply system is widely used in the field of industry as a power source than single-phase power supply system for the reasons of energy efficiency, cost of device, power factor and convenience in use. However, the conventional protective device only detects any two phases of the three-phase power source. In case there are fault conditions of undervoltage and/or phase failure happen in the non-detecting phase, the protective device will not have the ability of detecting this fault. In a result, the electrical load, especially induction motor, will be damaged. Moreover, the fault condition will not be detected accurately because the actuating coil of the electromagnetic switch will have a voltage drop thereacross when the load is being powered. That is, the protective device will not cut off the load from the three-phase power source because the actuating coil of the electromagnetic switch is not sensitive to the voltage change of the power source. In a result, the fault condition will keep the electrical load powering and cause damage to the electrical load.

SUMMARY OF THE INVENTION

For obviating the aforementioned drawback and problem found in prior art, it is the primary object of the present invention to provide a useful electromagnetic switch with a protective device for preventing the three-phase electrical load from being damaged caused by undervoltage and/or phase failure.

It is a further object of the present invention to provide a protective device for automatically stopping the power supply to the three-phase load, especially a three-phase induction motor, from the three-phase power source so as to avoid damage to the electrical load.

It is a further object of the present invention to provide an electromagnetic switch with build-in protective device mounted on the housing of the electromagnetic switch, so that it is compatible with the conventional electromagnetic switch in installation.

The other objects and features of this invention will become more fully apparent and readily understood from the following description together with the accompanying drawings. While the circuit arrangement and structure herein described constitutes a preferred embodiment of this invention, it is to be understood that the present invention is not limited to this precise form and that changes may be made therein without departing from the scope and spirit of the invention as defined in the appended claim.

DESCRIPTION OF THE PREFERRED EMBODIMENT

Figure 1:
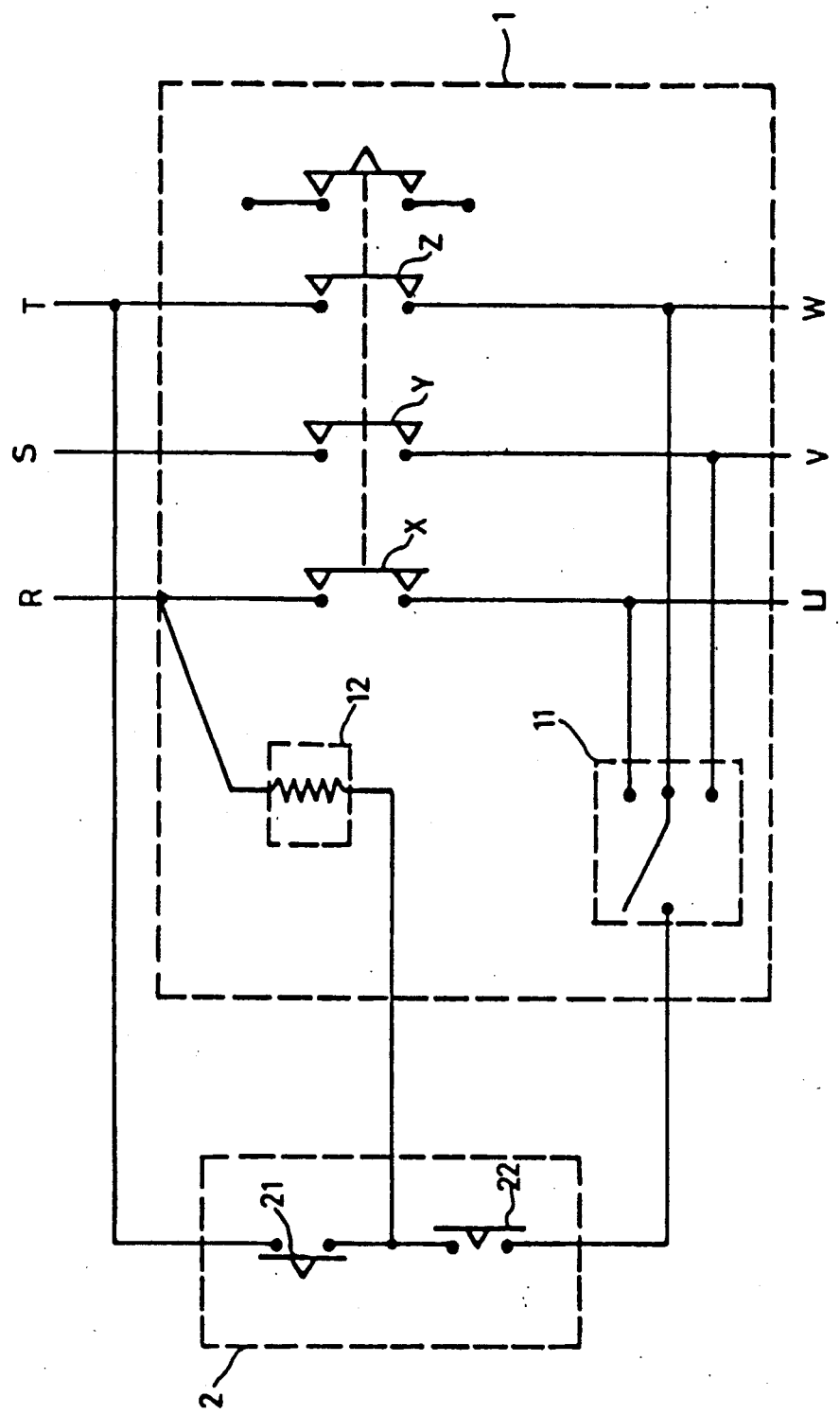
FIG. 1 illustrates the schematic diagram of the present invention showing the connection of wiring a electromagnetic switch, a external push-button switch and the protective circuit according to the present invention.

The present invention is described in detail, with reference to the accompanying drawings, as follows: As shown in FIG. 1, the electromagnetic switch 1 includes a actuating coil 12. A external push-button 2 has a normally opened button 21 an a normally closed button 22 for energizing or de-energizing the actuating coil 12 so as to control the operation of the electromagnetic switch. The one end of the actuating coil 12 is connected to the junction of the normally closed button 22 and the normally opened button 21, while the other end of the actuating coil 12 is connected to the phase line R of the power source. According to the present invention, the circuit arrangement of the protective device has four terminals in which one terminal is connected to the normally closed button 22 of the external push-button 2 and another three terminals are connected to the three phase line R, S and T of the power source respectively. In operation, once the normally opened button 21 of the push-button 2 is depressed, the actuating coil 12 will be energized so that the three-phase power source R, S and T will be conducted to the load side labeled with U, V and W via the contacts X, Y and Z of the electromagnetic switch respectively. In this wiring connection, as long as undervoltage and/or phase failure condition is happen, the protective circuit 11 will de-energize the actuating coil 12 to cut the electrical load (not shown) off the power source in order to protect the electrical load.

Figure 2:
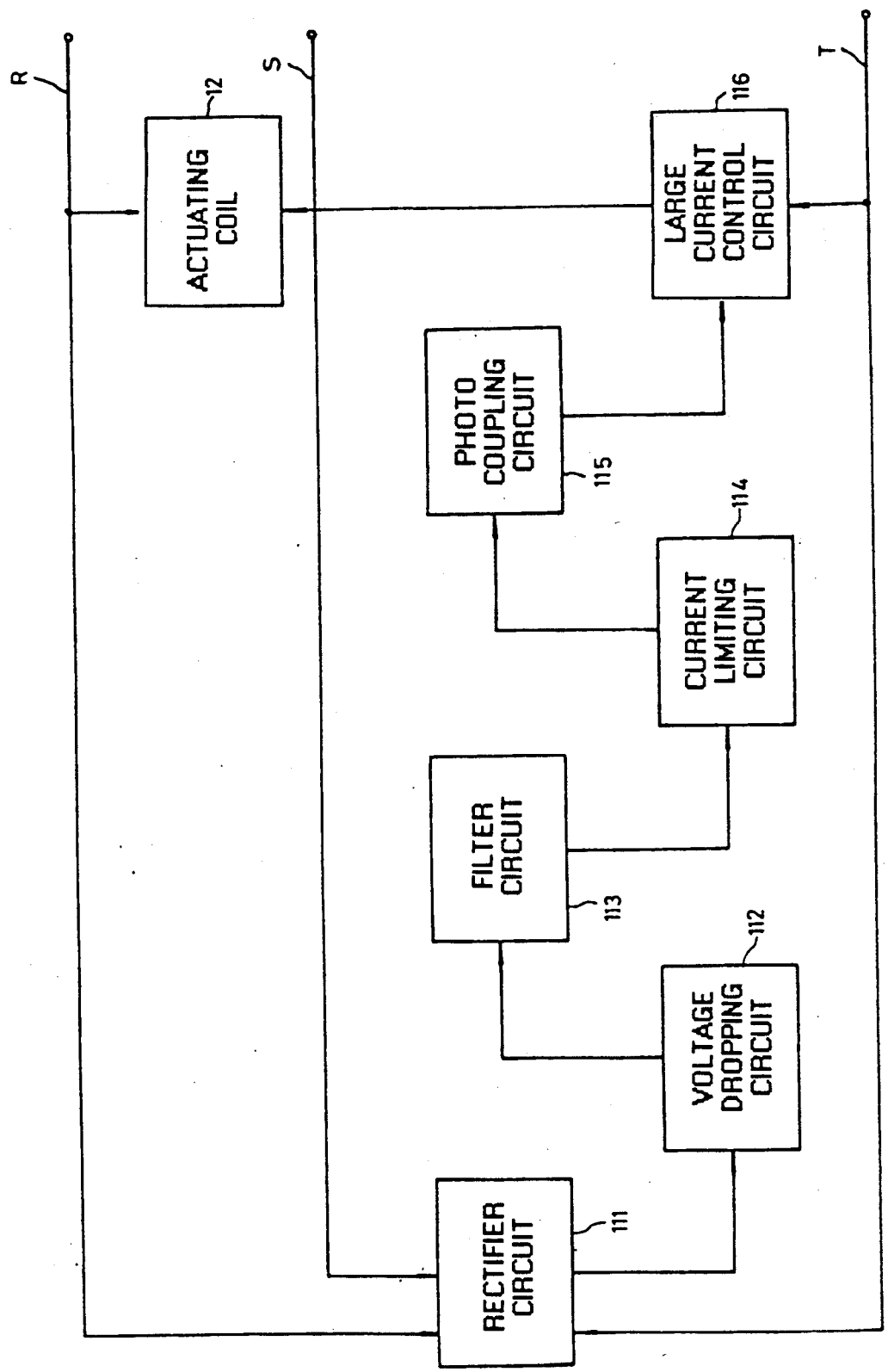
FIG. 2 illustrates the function block diagram of the present invention.

The protective circuit of the present invention, as shown in FIG. 2, includes a rectifier circuit 111, a voltage dropping circuit 112, a filter circuit 113, a current limiting circuit 114, a photo coupling circuit 115, and a large current control switch 116 for controlling the actuating coil 12 of the electromagnetic switch.

Figure 3:
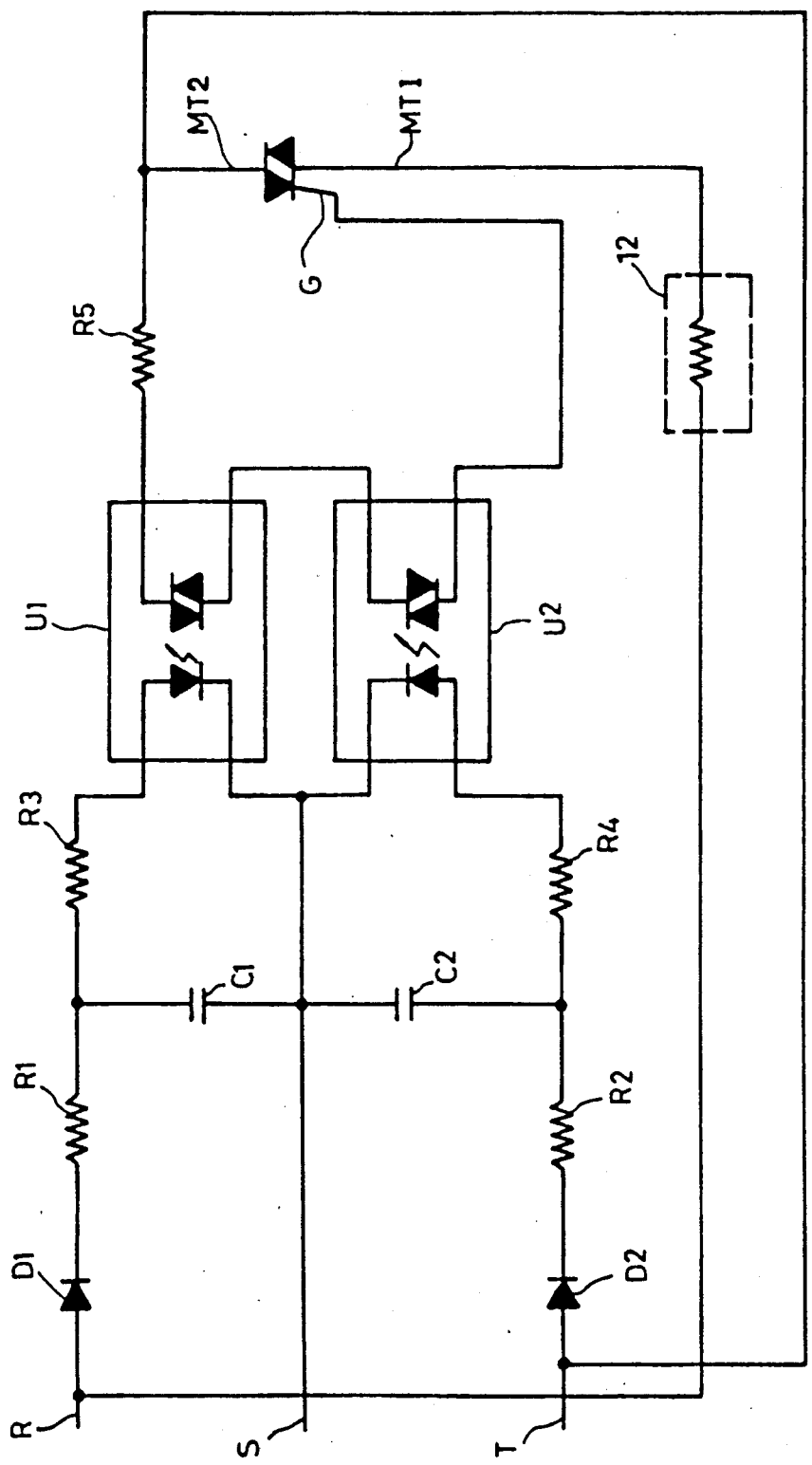
FIG. 3 is the circuit diagram of the circuit arrangement of the protective device of the present invention.

The detail circuit diagram thereof is shown in FIG. 3. The three-phase power source which is in the form of AC power source having three phase line R, S and T is rectified into a half-wave DC current by means of the rectifier circuit 111 composed of diodes D1 and D2. This half-wave DC voltage is dropped by resistor R1 and R2 and further filtered by capacitor C1 and C2 to provide a well-filtered DC voltage. The filtered DC voltage is supplied to the photo coupling circuit 115 composed of a couple of photo coupler U1 and U2 via current limiting resistor R3 and R4 respectively. The TRIAC (formal name is bi-directional triode thyristor), which is connected in series with the actuating coil 12 of the electromagnetic switch and then connected across phase line R and T, having a first main terminal MT1, a second main terminal MT2 and a control gate G serves as a large current control switch 116. The output of the photo coupling circuit 11, which is formed by the first photo coupler U1 and second photo coupler U2 in series, is connected across the control gate G and the second main terminal MT2 of the TRIAC. A resistor R5 interconnected between the second main terminal MT2 of the TRIAC serves as a current limiting resistor.

Figure 4:
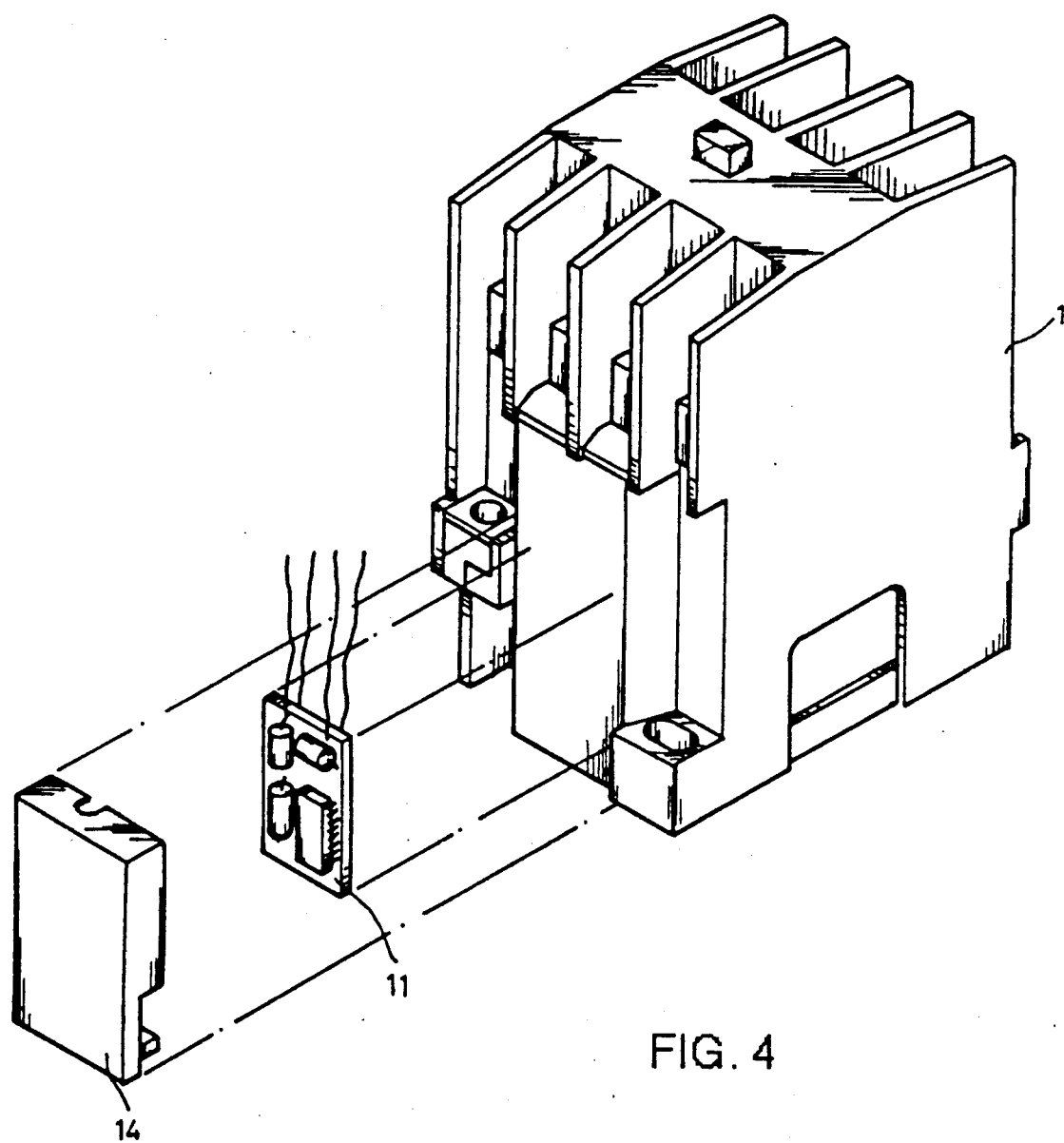
FIG. 4 is the perspective view of the present invention showing that the printed circuit board is attached on the housing of the electromagnetic switch.

Referring to FIG. 4, the protective circuit 11 of the protective device according to the present invention is compacted on a printed circuit board. The printed circuit board is mounted on the side wall of the electromagnetic switch 1, and then covered with a cover member 14. In this configuration, the present invention makes improvement in effectiveness as described above and compatible with the conventional electromagnetic switch with little change in construction and wiring connection.

I claim:

1. A protective device for preventing electrical load from undervoltage and phase failure condition in a three-phase power supply system by controlling actuating coil of an electromagnetic switch to cut off three-phase power source to the load, which comprises:

a rectifier means having three terminals connected to the three phase line of the three-phase AC power source for providing a DC power source;

a voltage dropping means for dropping the DC power source from the rectifier means into a lower DC voltage;

a filter circuit for filtering the DC voltage from the voltage dropping means into a well-filtered DC voltage;

a current limiting circuit for limiting the current flow of the filter circuit; a photo coupling circuit connected to the current limiting circuit, which having a first photo coupler and a second photo coupler connected in series; and a large current control switch having a control gate controlled by the photo coupling circuit, a first main terminal and second main terminal, in which the first main terminal and the second main terminal are connected in series with the actuated coil of the electromagnetic switch and then connected across the any two phase lines of the three-phase power source while the control gate is controlled by the photo coupling circuit so that when the fault condition caused by undervoltage and phase failure of the three-phase power source is happen, the large current control switch cut the load off the three-phase power source.

* * * * *